United States Patent [19]

Josey et al.

[11] B 3,925,497

[45] Dec. 9, 1975

[54] SUBSTITUTED 1,3,7-OCTATRIENES AND THEIR PREPARATION

[75] Inventors: Alden Dwayne Josey; Jack Robert Kirchner, both of Wilmington, Del.

[73] Assignee: E. I. DuPont de Nemours and Company, Wilmington, Del.

[22] Filed: Oct. 24, 1973

[21] Appl. No.: 409,026

[44] Published under the Trial Voluntary Protest Program on January 28, 1975 as document no. B 409,026.

Related U.S. Application Data

[63] Continuation-in-part of Ser. No. 79,644, Oct. 9, 1970, abandoned.

[52] U.S. Cl.......... 260/677 R; 260/369; 260/614 A; 260/683.9; 260/77.5 AM
[51] Int. Cl.². ........................................ C07C 11/00
[58] Field of Search .... 260/677 R, 682 R, 683.15 R

[56]                References Cited
             UNITED STATES PATENTS

| | | | |
|---|---|---|---|
| 3,267,169 | 8/1966 | Smutny | 260/682 |
| 3,444,258 | 5/1969 | Kohnle et al. | 260/677 |
| 3,449,463 | 6/1969 | Kenton et al. | 260/677 |
| 3,457,319 | 7/1964 | Olechowski et al. | 260/677 |
| 3,501,540 | 3/1970 | Zuech | 260/666 |
| 3,522,321 | 7/1970 | DeYoung | 260/666 |

OTHER PUBLICATIONS

Takahashi et al., "The Dimerization of Butadiene," Chem. Society of Japan, Vol. 41, pp. (454–460), 1968.
Chem. Abstracts–Vol. 67, 1967, p. 53559d.
Goldblott et al., "The Production of α- and β- Pyronene From Allo–Ocumeno," Journal of American Chem. Soc., Vol. 66, pp. (655 and 656).

*Primary Examiner*—Paul M. Coughlan, Jr.
*Assistant Examiner*—Juanita M. Nelson

[57]             ABSTRACT

There are disclosed alkyl substituted 1,3,7-octatrienes of the formula

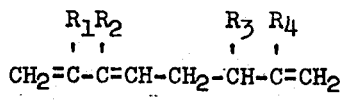

in which at least one of $R_1$ and $R_4$ is an alkyl group and the other is hydrogen when it is not an alkyl group, and $R_2$ and $R_3$ are each an alkyl group or hydrogen, provided that when either $R_1$ or $R_4$ is an alkyl group and the other is hydrogen and either $R_2$ or $R_3$ is hydrogen, the other of $R_2$ and $R_3$ is hydrogen, which alkyl group or groups are 1–8 carbon straight chain alkyl groups. Also disclosed is the preparation of such alkyl substituted octatrienes by the homodimerization of a 2-alkyl-1,3-butadiene or a 2,3-dialkyl-1,3-butadiene; by the codimerization of 1,3-butadiene and one such alkylbutadiene or one such dialkylbutadiene; or by the codimerization of two different such alkylbutadienes, two different such dialkylbutadienes, or one such alkylbutadiene and one such dialkylbutadiene. Such homodimerizations and codimerizations are effected using a catalyst which is a dienophile-coordinated palladium-phosphine complex such as bis-(triphenylphosphine)-(maleic anhydride)palladium.

The above alkyl substituted octatrienes can be used in Diels-Alder condensations with 1,4-naphthoquinone to form products that can be converted to tetrahydro-1-alkylanthraquinones that are outstandingly useful as working intermediates in cyclic reduction-oxidation methods for producing hydrogen peroxide.

18 Claims, No Drawings

SUBSTITUTED 1,3,7-OCTATRIENES AND THEIR PREPARATION

CROSS-REFERENCE TO RELATED CASES

This application is a continuation in part of our co-pending application, Ser. No. 79,644, filed Oct. 9, 1970 now abandoned. Our application, Ser. No. 79,642, now U.S. Pat. No. 3,778,452 filed of even date with Application Ser. No. 79,644, discloses the use of the alkyl substituted 1,3,7-octatrienes of the present invention in the production of certain 1-alkenylanthraquinones.

The application of Kirchner and Vaughan, Ser. No. 79,643, filed of even date with Application Ser. No. 79,644 and now abandoned, discloses certain 5,6,7,8-tetrahydro-1-alkylanthraquinones, their preparation from the above 1-alkylanthraquinones, and their use as working intermediates in cyclic reduction-oxidation methods for producing hydrogen peroxide.

BACKGROUND OF THE INVENTION

1. Field of the Invention

This invention relates to the production of alkyl substituted 1,3,7-octatrienes by the catalytic dimerization of alkyl substituted 1,3-butadienes.

2. Prior Art

Smutny U.S. Pat. No. 3,267,169, issued Aug. 16, 1966, discloses the production of $C_8$–$C_{10}$ 1,3,7-octatrienes by the catalytic degradation of aromatic 2,7-octadiene ethers having 0 to 2 methyl substituents on the octadienyl moiety, which ethers are prepared by the reaction of a phenol with butadiene or isoprene. When butadiene is used to prepare the intermediate octadiene ether, the final product is reported to be 1,3,7-octatriene, whereas when isoprene is similarly used, the final product is 3,6-dimethyl-1,3,7-octatriene and/or 3,7-dimethyl-1,3,7-octatriene.

Takahashi et al., Bull. Chem. Soc. Japan, 41, 454–460 (1968), disclose the dimerization of 1,3-butadiene using a dienophile-coordinated palladium-phosphine complex such as bis(triphenylphosphine)(maleic anhydride)palladium to obtain 1,3,7-octatriene. No dimerization of any substituted 1,3-butadiene is disclosed. When substituted 1,3-butadienes, e.g., 2-methyl-1,3-butadiene and 2,3-dimethyl-1,3-butadiene, are subjected to dimerization, several dimerization products are theoretically possible, and the selective obtainment of specific substituted triene dimerization products in high yield is unpredictable.

SUMMARY OF THE INVENTION

One embodiment of the invention is an alkylsubstituted 1,3,7-octatriene of the formula

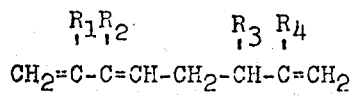

in which both $R_1$ and $R_4$ are alkyl groups, or either is an alkyl group and the other is hydrogen; each of $R_2$ and $R_3$ is an alkyl group or hydrogen, provided that when either $R_1$ or $R_4$ is an alkyl group and the other is hydrogen and either $R_2$ or $R_3$ is hydrogen, the other of $R_2$ and $R_3$ is hydrogen; which alkyl group or groups are 1–8 carbon straight chain hydrocarbon alkyl groups.

Another embodiment of the invention is a method for preparing such an alkylsubstituted 1,3,7-octatriene, which method comprises: (A) homodimerizing either a monoalkyl butadiene of the formula

$CH_2=C-CH=CH_2$, or a dialkyl butadiene of the formula

$CH_2=C-C=CH_2$, in which $R_1$ and $R_2$ are alkyl substituent groups as defined above; or (B) codimerizing either (a) 1,3-butadiene and one such monoalkyl butadiene or one such dialkyl butadiene, or (b) two different such monoalkyl butadienes or two different such dialkyl butadienes, or (c) one such monoalkyl butadiene and one such dialkyl butadiene, in the presence of a catalyst which is a dienophile-coordinated palladium-phosphine complex.

DETAILED DESCRIPTION AND PREFERRED EMBODIMENTS

The alkyl substituted 1,3,7-octatrienes of the invention are prepared by carrying out homodimerization or codimerization reactions involving a monoalkyl butadiene of the formula

$CH_2=C-CH=CH_2$, and/or a dialkyl butadiene of the formula
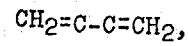
$CH_2=C-C=CH_2$, in which formulas all of the $R_1$ and $R_2$ substituent groups are 1–8 carbon straight chain hydrocarbon alkyl groups. Illustrative of the monoalkyl butadienes are the 2-methyl-, 2-ethyl-, 2-(n-propyl)-, 2-(n-butyl)-, and 2-(n-heptyl)-1,3-butadienes. Illustrative of the dialkyl butadienes are 2,3-dimethyl-, 2,3-diethyl-, 2,3-di(-n-propyl)-, 2,3-di(-n-butyl)-, 2-methyl-3-ethyl-, and 2-methyl-3-(n-butyl)-1,3-butadienes, and the like. The butadienes employed should be free of substituents in the 1-position, since such butadienes do not undergo homodimerization in accordance with the invention.

The homodimerization of a monoalkyl butadiene of the above type in accordance with the invention yields mainly a 2,7-dialkyl-1,3,7-octatriene in which the two alkyl substituent groups are the same as the alkyl substituent group of the parent butadiene. The dimerization of a dialkyl butadiene of the above type in which the two alkyl groups are the same yields a 2,3,6,7-tetraalkyl-1,3,7-octatriene in which all the alkyl groups are the same. When the alkyl groups of the dialkyl butadiene are different, several tetraalkyl-1,3,7-octatriene dimerization products are possible with the predominant product having the larger alkyl groups in the 2 and 7 positions. Similarly, when butadiene is codimerized with a monoalkyl butadiene of the above type, the predominant product is a 7-alkyl-1,3,7-octatriene. Thus, all the dimerization and codimerization reactions carried out in accordance with the invention proceed so as to yield as the dominant product of any given reaction where several products are possible that substituted 1,3,7-octatriene which will have the larger alkyl groups in the 2 and 7 positions with the largest group in the 7 position.

The homodimerization and codimerization reactions are carried out in the presence of a dienophile-coordinated palladium-phosphine complex which catalyzes the reactions. The preferred catalyst is bis(triphenylphosphine)(maleic anhydride)-palladium. Other such complexes which are effective catalysts are bis(triphenylphosphine)(p-benzoquinone)palladium, bis(triphenylphosphine)(N-phenyl maleimide)palladium, bis(triphenylphosphine)(dimethylmaleate(palladium, bis(triphenylphosphine)-(1,4-naphthoquinone)palladium. The amount of such catalysts used should, of course, be sufficient to cause the reaction to proceed at a practical rate. In general, catalysts concentrations ranging from about 0.1 to 5 perecent based upon the total weight of the reaction mixture are effective and will be employed, although higher concentrations can be used. The preferred catalyst concentrations range from about 0.5 to 2 percent.

The above reactions can be carried out effectively in the absence of any added solvent or diluent. However, it is generally preferred to carry out the reactions in the presence of an organic solvent which is liquid under the conditions of use and is a solvent for and inert towards the reactants, the catalyst and the reaction products. Examples of such solvents are the aliphatic ketones such as acetone and methyl ethyl ketone, ethers such as tetrahydrofuran and dioxane, and hydrocarbons such as benzene, xylene, toluene and heptane. The amount of solvent used will generally range from 50 to 500 percent, based upon the total weight of the reactants, although lesser and greater amounts can be used.

The dimerization and codimerization reactions of the invention can be carried out at temperatures ranging generally from 25° to about 150°C., but temperatures from about 75° to 125°C. are preferred. The reaction should be carried out at pressures sufficient to maintain the reactants and solvent in the liquid state. When using low boiling solvents, e.g., acetone, and/or reactants, e.g., 1,3-butadiene or isoprene, pressures of from 50 to 300 psig or higher are suitable, with pressures of 75 to 200 psig being preferred. When the reactants and solvent have boiling points above the chosen reaction temperature, atmospheric pressure is suitable. As a general rule, the reaction will be carried out by heating the reaction mixture including solvent, if used, under autogenous pressure at the chosen reaction temperature until the reaction is complete or has proceeded to a practical extent. The reaction time will depend upon such factors as the temperature and catalyst concentration and the time required for a given conversion will generally be shorter at higher temperatures and higher catalyst concentrations than at lower temperatures and lower catalyst concentrations. In general, when using reaction temperatures and catalyst concentrations within the preferred ranges, the reaction times will range from about 1 to 15 hours with the preferred times ranging from about 3 to 10 hours.

The dimerization products of the reactions can be separated from the reaction mixtures, when separation is desired, by usual fractional distillation procedures.

Illustrative of the alkyl substituted 1,3,7-octatrienes of the invention, which are products of the homodimerization and codimerization reactions described above, are: 7-methyl-1,3,7-octatriene, 2-methyl-1,3,7-octatriene, 7-ethyl-1,3,7-octatriene, 2-ethyl-1,3,7-octatriene, 2,7-dimethyl-1,3,7-octatriene, 2,7-diethyl-1,3,7-octatriene, 2,7-di(n-butyl)-1,3,7-octatriene, 2-methyl-7-ethyl-1,3,7-octatriene, 2-ethyl-7-methyl-1,3,7-octatriene, 6,7-dimethyl-1,3,7-octatriene, 2,3-dimethyl-1,3,7-octatriene and 2,3,6,7-tetramethyl-1,3,7-octatriene.

The 2,7-dimethyl-1,3,7-octatriene product of the invention is unique among the dimethyl-1,3,7-octatrienes, since it alone can undergo a series of particular reactions which lead to certain useful polymers, such as polyurethanes. The other dimethyl-1,3,7-octatrienes can not fully participate in these specific reactions. The 2,7-dimethyl-1,3,7-octatriene compound is also useful in making perfumes.

The invention is illustrated by the following examples:

EXAMPLE 1

A 2-liter autoclave was charged with 500 g. of isoprene (2-methyl-1,3-butadiene), 520 ml. of acetone and 8 g. of bis(triphenylphosphine)(maleic anhydride)-palladium. The charged mixture was heated in the autoclave at 105°C. under autogenous pressure for 10 hours, the cooled and vented to the atmosphere. Upon distilling the crude product mixture under the vacuum from a water pump, 45 g. of isoprene was recovered, indicating a 91 percent conversion. After distilling off the acetone under the water pump vacuum, the isoprene dimer was separated by distillation at a pressure of 1–2 mm. Hg. There was obtained 332 g., 75 percent yield, of a clear colorless product shown by gas chromatography to be 97–98 percent pure. Redistillation gave the pure dimer with a boiling point of 66°C. at 20 mm. Hg.

The structure of the above dimer product was established by its nuclear magnetic resonance spectrum (Applications of Nuclear Magnetic Resonance Spectroscopy in Organic Chemistry, L. M. Jackman, Pergmon, London, 1959) which was that expected for 2,7-dimethyl-1,3,7-octatriene. Additionally, mass spectrometry (Mass Spectrometry. Organic Chemical Applications, K. Biemann, McGraw-Hill, New York, 1962) indicated a molecular weight of 136, which is the calculated value. Furthermore, catalytic hydrogenation of the purified dimer, using a palladium-on-carbon catalyst (10% Pd) gave 2,7-dimethyloctane which was characterized by comparison of its nuclear magnetic resonance (NMR) spectrum with that of authentic material.

EXAMPLE 2

A 200 ml. stainless steel rocker bomb was charged with 40 g. of 2-ethyl-1,3-butadiene, 40 ml. of acetone and 1.0 g. of bis(triphenylphosphine)(maleic anhydride)palladium. The charge was heated at 110°C. for 9 hours under autogenous pressure, then cooled and vented. Volatile materials were distilled off at water pump vacuum, and the liquid residue was fractionally distilled under reduced pressure. There was obtained a 30.3 g. fraction (representing a 75 percent yield) boiling at 44°–46°C., 0.75 mm. Hg, which fraction was identified by its NMR spectrum as 2,7-diethyl-1,3,7-octatriene.

EXAMPLE 3

A charge of 9.0 g. of 2-(n-butyl)-1,3-butadiene, 25 g. of acetone and 0.5 g. of bis(triphenylphosphine)(maleic anhydride)palladium was heated in an autoclave at 100°C. for 7 hours under autogenous pressure. On distillation of the reacted mixture under reduced pressure, a fraction boiling at 75°–80°C., 0.2 mm. Hg, was obtained. This material was identified by its NMR spectrum as 2,7-di(n-butyl)-1,3,7-octatriene, which is the linear dimer of 2-(n-butyl)-1,3-butadiene.

EXAMPLE 4

A charge of 51 g. of 2,3-dimethyl-1,3-butadiene, 75 ml. of acetone and 1.0 g. of bis(triphenylphosphine)(maleic anhydride)palladium was heated in an autoclave at 105°C. for 8 hours under autogenous pressure. Periodic examination of the mixture by gas-liquid chromatography showed that two dimeric products were being formed in about equal amounts. Distillation of the reacted mixture under reduced pressure gave a fraction (A) boiling at 65°–70°C., 10 mm. Hg, and another fraction (B) boiling at 75°–80°C., 10 mm. Hg. The NMR spectrum of fraction A contained three separate resonance peaks of equal intensity for terminal olefinic protons, which together with other features of the spectrum, established that it was 2,6,7-trimethyl-3-methylene-1,7-octadiene. The NMR spectrum of fraction B contained resonance peaks for two types of terminal olefinic protons and one internal olefinic proton, which together with other features of the spectrum, established that it was 2,3,6,7-tetramethyl-1,3,7-octatriene.

EXAMPLE 5

A charge of 25 g. (0.3 gram mole) of 2-ethyl-1,3-butadiene, 21 g. (0.3 gram mole) of isoprene, 40 ml. of acetone and 1.0 g. of bis(triphenylphosphine)(maleic anhydride)-palladium was stirred and heated in an autoclave at 105°C. for 7 hours under autogenous pressure. Periodic examination of the reaction mixture by gas-liquid chromatography showed that, in addition to the homodimers of isoprene and 2-ethyl-1,3-butadiene, a new mixed dimer of intermediate retention time was being formed. The reacted mixture was worked up as in the preceeding examples and the dimeric products were fractionally distilled through an 18 inch spinning band column under reduced pressure. The fraction boiling at 75°–85°C., 14 mm. Hg, and weighing 6.63 g. was shown by its NMR spectrum to consist of a mixture of 65 percent by weight 2-methyl-7-ethyl-1,3,7-octatriene and 35 percent by weight 2-ethyl-7-methyl-1,3,7-octatriene, which octatrienes were codimers of isoprene and 2-ethyl-1,3-butadiene.

EXAMPLE 6

A charge of 136 g. (2 gram moles) of isoprene, 108 g. (2 gram moles) of 1,3-butadiene, 300 ml. of acetone and 2.0 g. of bis(triphenylphosphine)(maleic anhydride)-palladium was stirred and heated in a 2-liter autoclave at 105°C. for 8 hours under autogenous pressure. The autoclave was then cooled and vented and the resulting light brown solution was stripped of acetone and unreacted starting materials at water pump pressure. The residual material was rapidly distilled at water pump pressure with a hot water bath to separate the dimeric products in one fraction. Examination of this fraction by gas-liquid chromatography showed three peaks in the approximate ratios 1:2.2:1 (area percentages). These were due, respectively, to 1,3,7-octatriene (the homodimer of 1,3-butadiene), the 1,3-butadiene/isoprene codimerization products, and the isoprene homodimerization product. Separation of the above products was accomplished by fractional distillation through an 18-inch spinning band column at 40–45 mm. Hg. The fraction boiling at 67°C., 43 mm. Hg, and weighing 33.84 g. was shown by gas-liquid chromatography to be the codimerization products with only trace amounts of the two homodimerization products. Gas-liquid chromatography analyses of all fractions showed that the yield of codimerization products was 37.7 g. The yields of the isoprene and butadiene homodimers, respectively, were 20.4 g. and 15.1 g.

Analysis of the above fraction of codimerization products by nuclear magnetic resonance showed the presence of two isomeric $C_9$ trienes, i.e., 7-methyl-1,3,7-octatriene and 2-methyl-1,3,7-octatriene in the weight ratio of 65:35. Mass spectrometry established a molecular weight of 122, which is the calculated value, and the fragmentation pattern clearly established the presence of two isomers which are distinguished by the different positions of the methyl substituent.

EXAMPLE 7

A charge of 10.4 g. (0.2 gram mole) of 1,3-butadiene, 32.8 g. (0.4 gram mole) of 2,3-dimethyl-1,3-butadiene, 25 ml. of acetone and 1.0 g. of bis(triphenylphosphine)(maleic anhydride)palladium was heated in an autoclave at 102°C. for 3 hours under autogenous pressure. Fractional distillation of the resulting mixture under reduced pressure gave, in addition to the homodimers of 1,3-butadiene and 2,3-dimethyl-1,3-butadiene, a fraction boiling at 74°–75°C., 40 mm. Hg. Examination of this fraction by gas-liquid chromatography showed the presence of at least two isomers. Its NMR spectrum showed that it was a mixture of two isomeric $C_{10}$ trienes, i.e., 6,7-dimethyl-1,3,7-octatriene (major) and 2,3-dimethyl-1,3,7-octatriene (minor).

EXAMPLE 8

A charge of 25 g. of isoprene, 25 ml. of acetone and 1 g. of bis(triphenylphosphine)(p-benzoquinone)palladium was heated in an autoclave at 125°C. for 6 hours under autogeneous pressure. Examination of the resulting product by gas-liquid chromatography showed 2,7-dimethyl-1,3,7-octatriene, identified by comparison of its retention time with that of authentic material, to be present in substantial amounts.

As indicated by the series of reactions below, the alkyl substituted 1,3,7-octatrienes I of the invention undergo Diels-Alder condensations with 1,4-naphthoquinone to give adducts, which are 1-alkenyl anthraquinone derivatives II and are oxidized readily by air in the presence of a strong base such as potassium hydroxide to yield 1-alkenyl anthraquinones III. Hydro-

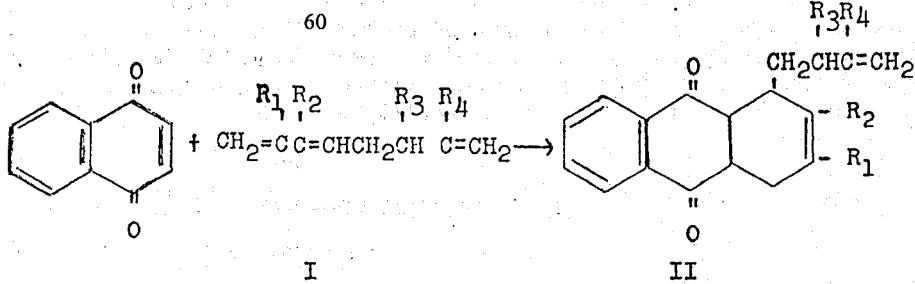

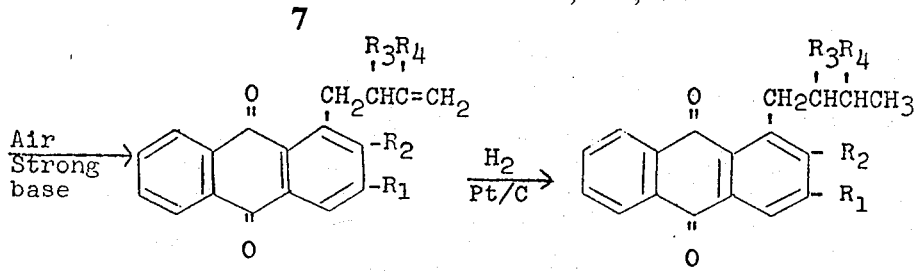

III

IV

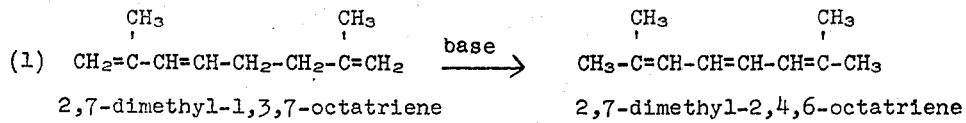

V genation of the latter in the presence of a metallic platinum catalyst on a charcoal support gives the corresponding 1-alkylanthraquinones IV which are converted to the corresponding 5,6,7,8-tetrahydro-1-alkylanthraquinones V by hydrogenation in the presence of Raney nickel catalyst. In the formulas indicated in the following reactions, at least one of $R_1$ and $R_4$ is an alkyl group and the other is either a hydrogen atom or an alkyl group, and each of $R_2$ and $R_3$ is a hydrogen atom or an alkyl group, which alkyl group or groups are 1–8 carbon straight chain hydrocarbon alkyl groups.

Thus, when the alkyl substituted octatriene reactant is the product of the homodimerization of isoprene, compound I is 2,7-dimethyl-1,3,7-octatriene (i.e., $R_1$ and $R_4$ in the formula are methyl groups and each of $R_2$ and $R_3$ is hydrogen), compound II is 1,4,4a,9a-tetrahydro-3-methyl-1-(3-methyl-3-butenyl)anthraquinone, compound III is 3-methyl-1-(3-methyl-3-butenyl)anthraquinone, compound IV is 3-methyl-1-(3-methylbutyl)anthraquinone and compound V is 5,6,7,8-tetrahydro-3-methyl-1-(3-methylbutyl)anthraquinone. Similarly, when compound I is 2,7-diethyl-1,3,7-octatriene compound V is 5,6,7,8-tetrahydro-3-ethyl-1-(3-methylpentyl)-anthraquinone; and when compound I is 2,3,6,7-tetramethyl-1,3,7-octatriene, compound V is 5,6,7,8-tetrahydro-2,3-dimethyl-1-(2,3-dimethyl)anthraquinone.

All of the above compound V tetrahydroalkylanthraquinones are outstandingly useful as working intermediates in the well-known cyclic reduction-oxidation method for producing hydrogen peroxide. In such a process, a solution of an alkylanthraquinone or tetrahydroalkylanthraquinone in a water-immiscible solvent or mixture of solvents is reduced, e.g., by hydrogenation in the presence of a supported metallic palladium catalyst or Raney nickel, to the corresponding alkylanthrahydroquinone or tetrahydroalkylanthrahydroquinone; the resulting solution of the latter is oxidized, e.g., with oxygen or air, to reform the alkylanthraquinone or tetrahydroalkylanthraquinone and simultaneously produce hydrogen peroxide, the hydrogen peroxide is recovered by extraction with water from the solution of alkyl anthraquinone or tetrahydroalkylanthraquinone, and the latter solution is recycled to the hydrogenation stage. The above compound V tetrahydroalkylanthraquinones can be used in such cyclic processes under the reduction and oxidation conditions commonly employed. Their use is particularly advantageous because of their high solubilities in both their reduced and oxidized forms in the water-immiscible solvents and solvent mixtures commonly used, thereby making possible the production of a greater amount of hydrogen peroxide per cycle and the recovery of more concentrated hydrogen peroxide solutions in the hydrogen peroxide extraction step, than is possible when using less soluble anthraquinones or tetrahydroanthraquinones.

EXAMPLE 9

The compound 2,7-dimethyl-1,3,7-octatriene was made by the procedure described in the first paragraph of Example 8.

The 2,7-dimethyl-1,3,7-octatriene can participate in a series of reactions which lead to useful polymer intermediates, whereas the other dimethyl-octatrienes give gross mixtures when used in these reactions.

All of the dimethyl-1,3,7-octatrienes will undergo the rearrangement depicted in equation (1) below to give dimethyl-2,4,6-octatrienes. Howver, the 2,7-dimethyl compound gives a single recoverable product in reaction (2) below, whereas the other dimethyl-2,4,6-octatrienes, when they are used in this type of reaction, give complex mixtures as products. With 2,7-dimethyl-2,4,6-octatriene reaction (2) occurs in a high yield of about 87 percent to give a dimethoxydiene as the only recoverable organic product. The efficiency and selectivity of reaction (2) appear to require that the triene termini be completely substituted by alkyl groups. Of the various dimethyl-1,3,7-octatrienes only the 2,7-dimethyl-1,3,7-octatriene can be rearranged as in reaction (1) to give a conjugated triene with termini fully substituted.

By the appropriate choice of the alcohol component, reaction (2) can be used to make new glycols that are useful polymer intermediates, e.g., in the synthesis of polyurethanes as shown by equations (3) and (4) below.

(1) $CH_2=\overset{CH_3}{\underset{|}{C}}-CH=CH-CH_2-CH_2-\overset{CH_3}{\underset{|}{C}}=CH_2$ $\xrightarrow{base}$ $CH_3-\overset{CH_3}{\underset{|}{C}}=CH-CH=CH-CH=\overset{CH_3}{\underset{|}{C}}-CH_3$ 2,7-dimethyl-1,3,7-octatriene            2,7-dimethyl-2,4,6-octatriene

VI            VII (2) VII + 2Hg(OAc)$_2$ + 2CH$_3$OH $\longrightarrow$ 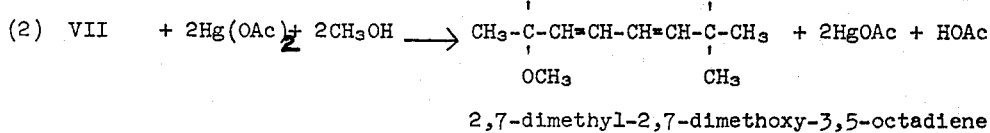 + 2HgOAc + HOAc 2,7-dimethyl-2,7-dimethoxy-3,5-octadiene

VIII (3) VII + 2Hg(OAc)$_2$ + 2HO(CH$_2$)$_2$OH $\longrightarrow$ 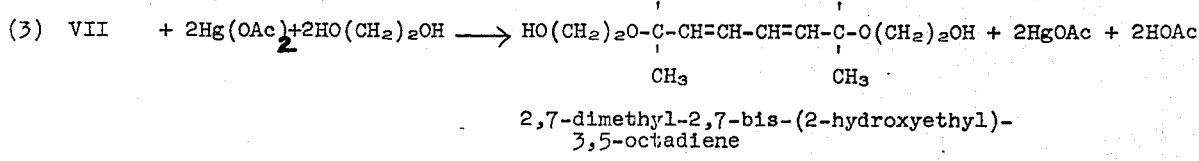 + 2HgOAc + 2HOAc 2,7-dimethyl-2,7-bis-(2-hydroxyethyl)-3,5-octadiene

IX (4) IX + 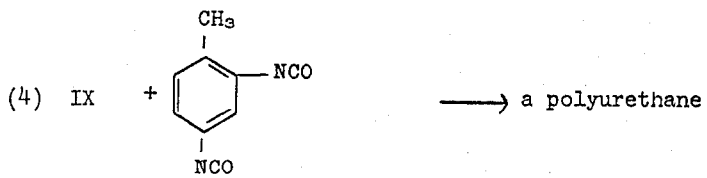 $\longrightarrow$ a polyurethane (Ac represents a CH$_3$C=O group)

We claim:
1. An alkyl substituted 1,3,7-octatriene of the formula

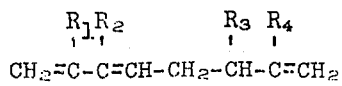

in which both R$_1$ and R$_4$ are alkyl groups, or either is an alkyl group and the other is hydrogen; and each of R$_2$ and R$_3$ is an alkyl group or hydrogen, provided that when either R$_1$ or R$_4$ is an alkyl group and the other is hydrogen and either R$_2$ or R$_3$ is hydrogen, the other of R$_2$ and R$_3$ is hydrogen, said alkyl groups being 1–8 carbon straight chain hydrocarbon alkyl groups.

2. An alkyl substituted octatriene according to claim 1 which is 2,7-dimethyl-1,3,7-octatriene.

3. An alkyl substituted octatriene according to claim 1 which is 2,7-diethyl-1,3,7-octatriene.

4. An alkyl substituted octatriene according to claim 1 which is 2,3,6,7-tetramethyl-1,3,7-octatriene.

5. An alkyl substituted octatriene according to claim 1 which is 2-methyl-7-ethyl-1,3,7-octatriene.

6. An alkyl substituted octatriene according to claim 1 which is 7-methyl-1,3,7-octatriene.

7. A method of preparing an alkyl substituted octatriene according to claim 1 comprising: (A) homodimerizing (a) a monoalkyl butadiene of the formula

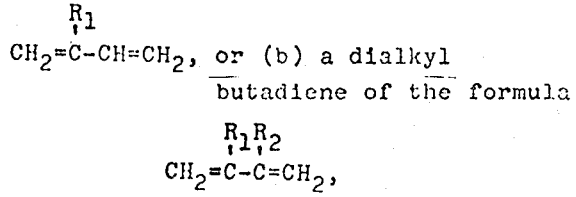

in which formulas R$_1$ and R$_2$ are 1–8 carbon straight chain hydrocarbon alkyl groups; or, (B) codimerizing (a) 1,3-butadiene and one such monoalkyl butadiene or one such dialkyl butadiene, or (b) two different such monoalkyl butadienes or two different such dialkyl butadienes, or (c) one such monoalkyl butadiene and one such dialkyl butadiene, under liquid phase conditions in the presence of a catalyst which is a dienophile-coordinated palladium-phosphine complex.

8. The method of claim 7 wherein the dimerization or codimerization is effective at a temperature of 25° to 150°C.

9. The method of claim 7 wherein the dimerization or codimerization is effected at a temperature of 75° to 125°C.

10. The method of claim 8 wherein the dimerization or codimerization is effected in the presence of a solvent which is an organic liquid that is a solvent for and inert under the conditions of use towards, the reactants, the catalyst and the dimerization or codimerization product.

11. The method of claim 8 wherein the solvent is acetone.

12. The method of claim 8 wherein the catalyst is bis(triphenylphosphine)(maleic anhydride) palladium.

13. The method of claim 8 wherein the catalyst is bis(triphenylphosphine)(p-benzoqinone) palladium.

14. The method of claim 8 wherein 2-methyl-1,3-butadiene is dimerized.

15. The method of claim 8 wherein 2-ethyl-1,3,-butadiene is dimerized.

16. The method of claim 8 wherein 2,3-dimethyl-1,3-butadiene is dimerized.

17. The method of claim 8 wherein 2-methyl-1,3-butadiene and 2-ethyl-1,3-butadiene are codimerized.

18. The method of claim 8 wherein 1,3-butadiene and 2-methyl-1,3-butadiene are codimerized.

* * * * *